United States Patent
Jump et al.

(10) Patent No.: US 9,298,499 B2
(45) Date of Patent: Mar. 29, 2016

(54) IDENTIFIER GENERATION USING NAMED OBJECTS

(75) Inventors: Daniel B. Jump, Redmond, WA (US); Brian T. Carver, Kirkland, WA (US); David C. LeBlanc, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 13/360,329

(22) Filed: Jan. 27, 2012

(65) Prior Publication Data

US 2013/0198831 A1 Aug. 1, 2013

(51) Int. Cl.
*G06F 9/48* (2006.01)
*G06F 21/62* (2013.01)
*G06F 21/44* (2013.01)
*G06F 21/60* (2013.01)

(52) U.S. Cl.
CPC ............ *G06F 9/4843* (2013.01); *G06F 21/44* (2013.01); *G06F 21/62* (2013.01); *G06F 21/60* (2013.01); *G06F 21/6218* (2013.01)

(58) Field of Classification Search
CPC ..... H04L 63/101; H04L 9/08; H04L 63/0428; G06F 21/62; G06F 9/4843; G06F 21/60; G06F 21/44; G06F 21/6218; H04W 12/06
USPC ..................... 726/27; 713/165–167
See application file for complete search history.

(56) References Cited

U.S. PATENT DOCUMENTS

| | | | |
|---|---|---|---|
| 4,761,808 A * | 8/1988 | Howard | H04M 3/382 379/114.14 |
| 5,522,077 A * | 5/1996 | Cuthbert | G06F 9/465 |
| 6,714,930 B1 * | 3/2004 | Garrison | H04L 63/101 |
| 7,328,242 B1 | 2/2008 | McCarthy et al. | |
| 7,539,768 B2 | 5/2009 | Hadi | |
| 7,716,734 B2 * | 5/2010 | Birrell | G06F 21/6218 713/182 |
| 7,778,970 B1 * | 8/2010 | Caronni | G06F 9/52 707/616 |
| 2006/0265754 A1 | 11/2006 | Birrell et al. | |
| 2007/0174839 A1 * | 7/2007 | Takahashi | G06F 9/485 718/100 |
| 2008/0077922 A1 | 3/2008 | Doring | |
| 2008/0222634 A1 | 9/2008 | Rustagi | |
| 2010/0223446 A1 * | 9/2010 | Katariya | G06F 11/3495 712/220 |
| 2011/0225226 A1 * | 9/2011 | Archer | G06F 9/54 709/201 |
| 2014/0109065 A1 * | 4/2014 | Dantam | G06F 11/362 717/130 |

FOREIGN PATENT DOCUMENTS

| | | |
|---|---|---|
| CN | 102236549 | 11/2011 |
| WO | WO-2010147486 | 12/2010 |

OTHER PUBLICATIONS

"Part 3 Introduction to Object Orientated Programming", May 7, 2007 (file's property), pp. 1-30 http://web.gccaz.edu/~gmarrer/cis150abbb/ebook/Chapter%2010%20Object%20Orientated%20Programming%20Design.doc.*

(Continued)

*Primary Examiner* — Jung Kim
*Assistant Examiner* — Carlos M De Jesus Lassala
(74) *Attorney, Agent, or Firm* — Steve Crocker; Danielle Johnston-Holmes; Micky Minhas

(57) ABSTRACT

A candidate identifier for a process is generated and an attempt is made to have a named object created that has a name that is the candidate identifier. In response to the attempt succeeding and the named object being created, the candidate identifier is used as an identifier for the process. In response to the attempt not succeeding and the named object not being created, the generating and attempting are repeated.

20 Claims, 6 Drawing Sheets

(56) References Cited

OTHER PUBLICATIONS

"Part 3 Introduction to Object Orientated Programming", May 7, 2007 (file's property), pp. 1-30 http://web.gccaz.edu/~gmarrer/cis150abbb/ebook/Chapter%2010%20bject%20Orientated%20Programming%20Design.doc.*

"Part 3 Introduction to Object Orientated Programming", May 7, 2007 (file's property), pp. 1-30 http://web.gccaz.edu/~gmarrer/cis150abbb/ebook/Chapter%2010%20bject%20orientated%20Programming%20Design.doc.*

Microsoft et al., "Object Names", Jan. 2, 2012, pp. 1 http://web.archive.org/web/20120102180949/http://msdn.microsoft.com/en-us/library/windows/desktop/ms684292(v=VS.85).aspx.*

"Part 3 Introduction to Object Orientated Programming", May 7, 2007 (file's property), pp. 1-30 http://web.gccaz.edu/~gmarrer/cis150abbb/ebook/Chapter%2010%20bject%20orientated%20Programming%20Design.doc.*

Ould-Ahmed-Vall, et al., "Distributed Global ID Assignment for Wireless Sensor Networks", Retrieved at <<http://users.ece.gatech.edu/dblough/research/papers/adhocnets09.pdf>>, Journal Ad Hoc Networks, vol. 7, No. 6, Aug. 2009, pp. 1-36.

"Foreign Office Action", CN Application No. 201310028786.3, Jul. 3, 2015, 18 Pages.

Tao, "Principle and Application of Database System", Science Press, Jan. 31, 2005, 6 pages.

"Foreign Office Action", CN Application No. 201310028786.3, Dec. 21, 2015, 8 Pages.

* cited by examiner

IDENTIFIER GENERATION USING NAMED OBJECTS

BACKGROUND

Computers typically run multiple programs concurrently, each of which can be run as one or more processes. It is oftentimes desirable to protect particular resources (e.g., storage areas, devices, etc.) so that they can be accessed only by particular processes. However, implementing such protection is not without its problems. One such problem is determining how to identify the different processes in a manner that allows the processes to be distinguished from one another while at the same time not overburdening resources (e.g., memory, processing capacity, etc.) of the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a candidate identifier for a process is generated at a device. An attempt is made to have a named object created with a name that is the candidate identifier. If the named object is created, then the candidate identifier is used as an identifier for the process. However, if the named object is not created, then the generating and attempting are repeated.

In accordance with one or more aspects, a request for an identifier for a process of a program is received. A candidate identifier for the process is generated, and an attempt is made to create a named object with a name that is the candidate identifier. In response to the attempt successfully creating the named object, the candidate identifier is returned to the program as the identifier for the process.

BRIEF DESCRIPTION OF THE DRAWINGS

The same numbers are used throughout the drawings to reference like features.

DETAILED DESCRIPTION

Identifier generation using named objects is discussed herein. A candidate identifier is generated for a process on a device. An attempt is then made to create a named object having the candidate identifier as the name of the object. An operating system of the device prevents multiple named objects from having the same name. If the attempt to create the named object is successful, then it is assumed that no other process is using the candidate identifier, and the candidate identifier is used as the identifier for the process. However, if the attempt to create the named object is not successful, then it is assumed that another process is using the candidate identifier, and another candidate identifier is generated. This generation of a candidate identifier and attempt to create a named object having the candidate identifier as the name of the object can be repeated one or more times.

Figure 1:
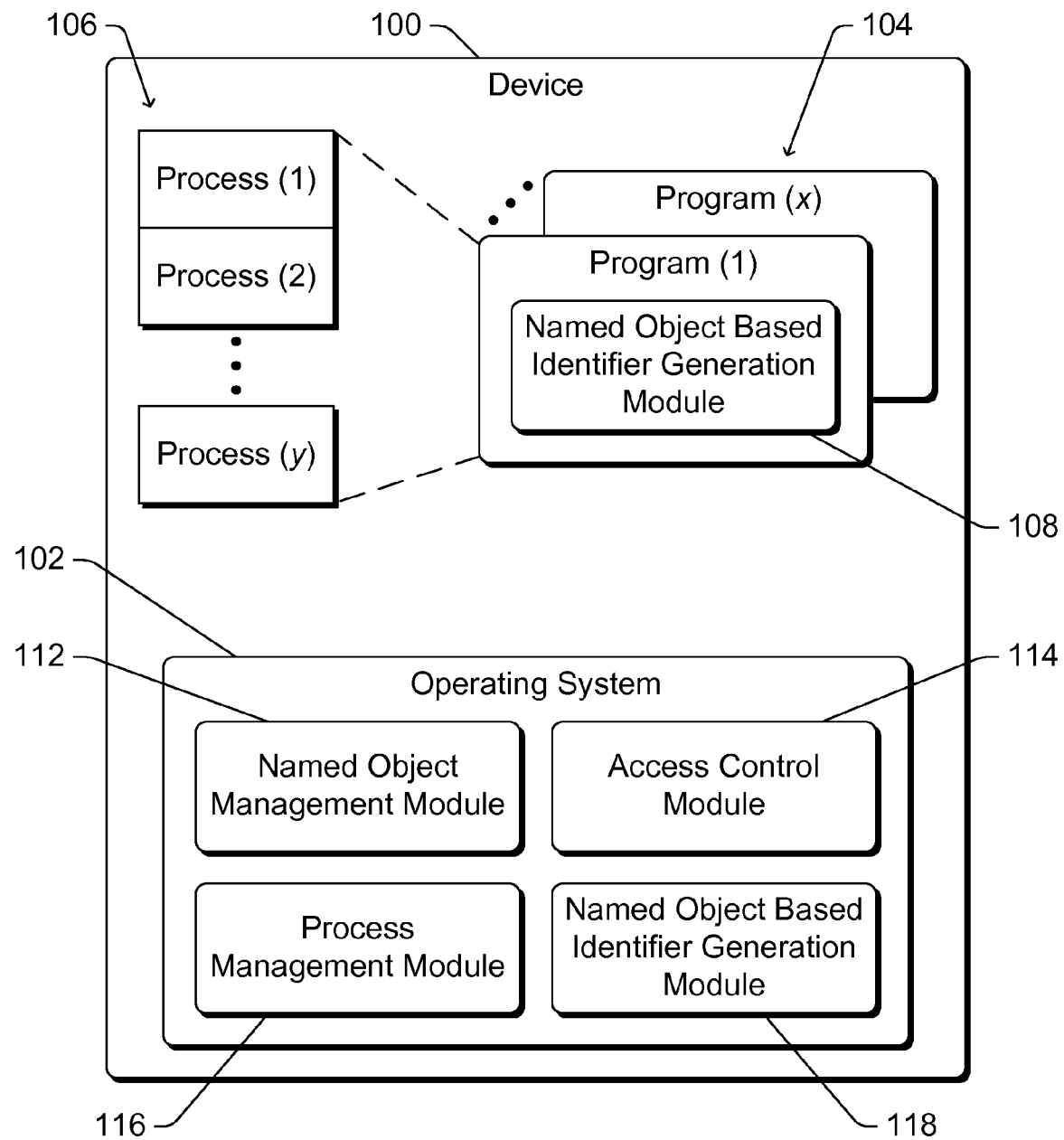
FIG. 1 is a block diagram illustrating an example device implementing the identifier generation using named objects in accordance with one or more embodiments.

FIG. 1 is a block diagram illustrating an example device 100 implementing the identifier generation using named objects in accordance with one or more embodiments. Device 100 can be a variety of different types of devices, such as a physical device or a virtual device. For example, device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 100 can also be a virtual device, such as a virtual machine running on a physical device. A virtual machine can be run on any of a variety of different types of physical devices (e.g., any of the various types listed above).

Device 100 includes an operating system 102 and one or more (x) programs 104. Various different programs can be run on device 100, such as entertainment programs, gaming programs, resource programs, utility programs, productivity programs, and so forth. Each program is run as one or more (y) processes 106 that are also referred to as corresponding to the program. Different programs 104 can have different numbers of processes 106.

Each program also includes a named object based identifier module 108 that generates identifiers for processes 106 of the program. These identifiers allow different processes 106 running on device 100 to be distinguished from one another, even though the processes can be generated by different programs 104, by different instances of the same program 104, by the same instance of the same program 104, combinations thereof, and so forth. The generated identifiers for processes 106 can be used in any situation in which processes 106 desire to have an identifier that is not concurrently used by any other process 106. For example, the identifiers for processes 106 can be used as security identifiers that indicate which of one or more resources of the device the process is permitted to access. The generation of these identifiers for processes 106 is discussed in more detail below.

Operating system 102 includes a named object management module 112, an access control module 114, a process management module 116, and a named object based identifier generation module 118. Although particular modules 112-118 are illustrated in FIG. 1, it should be noted that the functionality of one or modules 112-118 can be combined into a single module and/or the functionality of one or more modules can be separated into multiple modules.

Named object management module 112 manages named objects on device 100. This management includes creating named objects in response to requests from a program 104 or operating system 102, and deleting named objects released by a program 104 or operating system 102. A named object refers to an entity (e.g., an instance of a class) having one or more attributes and/or methods, at least one of which includes an identifier of the object that is referred to as a name of the object. Named object management module 112 prevents a named object from being created on device 100 if another object on device 100 already has that same name. Accordingly, only one named object in device 100 can have a particular name at any one time. However, it should be noted that once a named object is deleted, another object can be created having the same name as the deleted object.

Process management module 116 manages running of processes 106, including creating processes 106 in response to user requests to run programs, creating processes 106 in response to requests from other processes 106, ceasing execution of processes 106 in response to user requests to terminate a process, and so forth.

Access control module 114 manages access to various resources of device 100 by processes 106. In one or more embodiments, each process 106 has a security identifier that is associated with that process 106 and no other process 106. This security identifier can be an identifier for the process generated by named object based identifier generation module 108. Device 100 includes various different resources, such as different storage devices or components (or portions of storage devices or components), files or directories, different input devices or components, different output devices or components, and so forth. Access to particular resources by particular processes 106 can be restricted, and access control module 114 enforces these restrictions. Each process 106 has an associated security identifier, and these associated security identifiers are used by access control module 114 to determine whether a process 106 is permitted to access a resource. For example, each resource can have a corresponding access control list identifying which security identifiers are permitted to access the resource, and access control module 114 permits a process 106 to access the resource only if the process 106 has an associated security identifier identified by the access control list corresponding to the resource.

In one or more embodiments, operating system 102 also runs as one or more processes, which can be included as processes 106. In such embodiments, processes of operating system 102 also have associated identifiers that are generated by named object based security identifier generation module 118. Module 118 generates identifiers for processes of operating system in the same manner as named object based identifier generation module 108, as discussed in more detail below.

Figure 2:
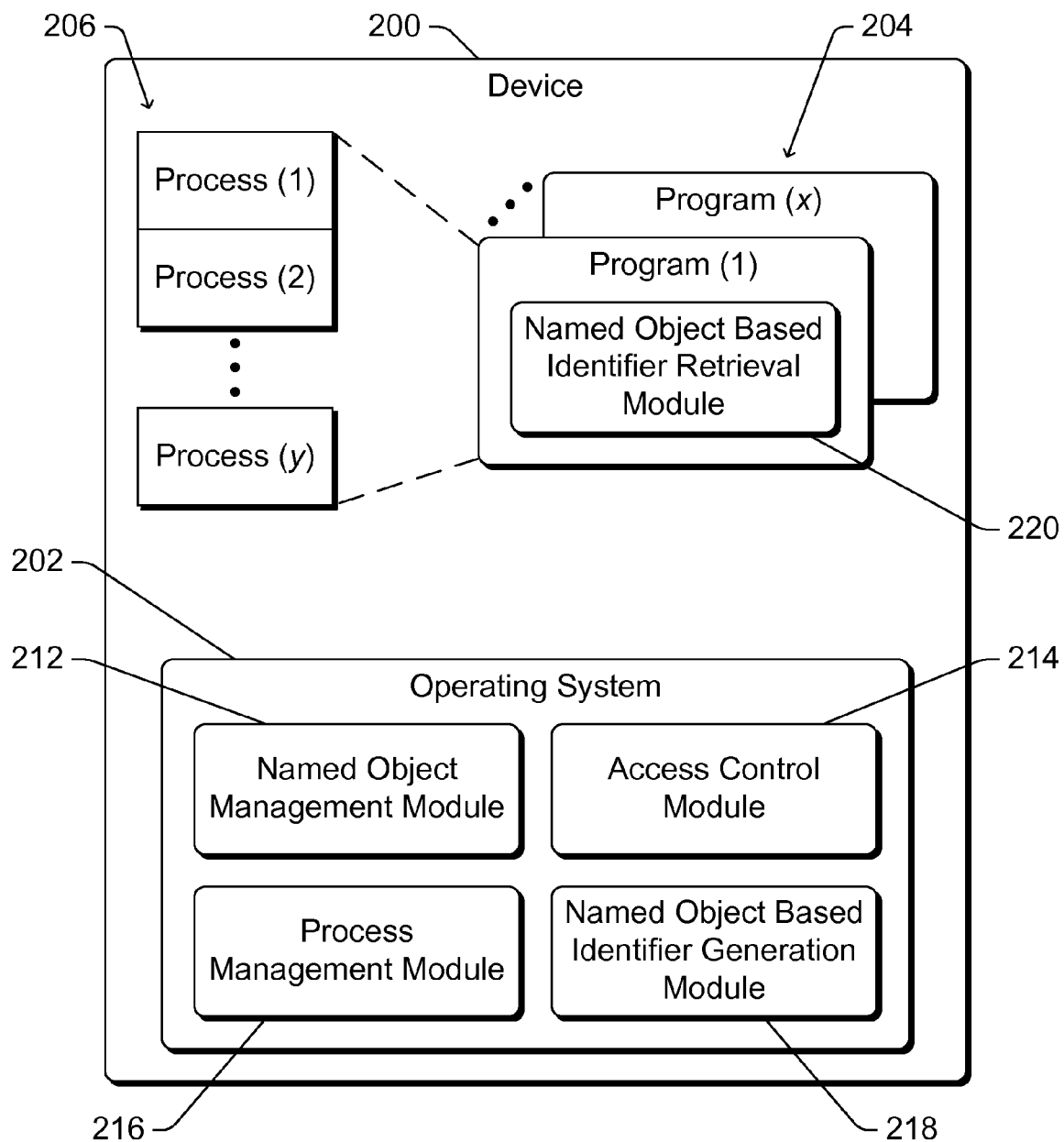
FIG. 2 is a block diagram illustrating another example device implementing the identifier generation using named objects in accordance with one or more embodiments.

FIG. 2 is a block diagram illustrating another example device 200 implementing the identifier generation using named objects in accordance with one or more embodiments. Device 200 can be a variety of different types of devices, analogous to device 100 of FIG. 1. Device 200 is similar to device 100 of FIG. 1, including an operating system 202, and one or more (x) programs 204 each run as one or more (y) processes 206. Operating system 202 includes a named object management module 212 analogous to named object management module 112 of FIG. 1, an access control module 214 analogous to access control module 114 of FIG. 1, a process management module 216 analogous to process management module 116 of FIG. 1, and a named object based identifier generation module 218.

Named object based identifier generation module 218 generates identifiers for processes of operating system analogous to named object based identifier generation module 118 of FIG. 1. Device 200 differs from device 100 of FIG. 1 in that named object based identifier generation module 218 generates identifiers for processes 206. Thus, rather than including a module that generates the identifier for a process 206, each program 204 includes a named object based identifier retrieval module 220 that requests an identifier for a process from named object based identifier generation module 218. Module 218 generates the identifier, as discussed in more detail below, and returns the generated identifier to named object based identifier retrieval module 220.

FIG. 1 illustrates an implementation in which identifiers for processes are generated by the programs, and FIG. 2 illustrates an implementation in which identifiers for processes are generated by the operating system. It should be noted that these implementations can be combined, with some programs on a device generating identifiers for processes and other programs on the same device obtaining identifiers for processes from the operating system.

Figure 3:
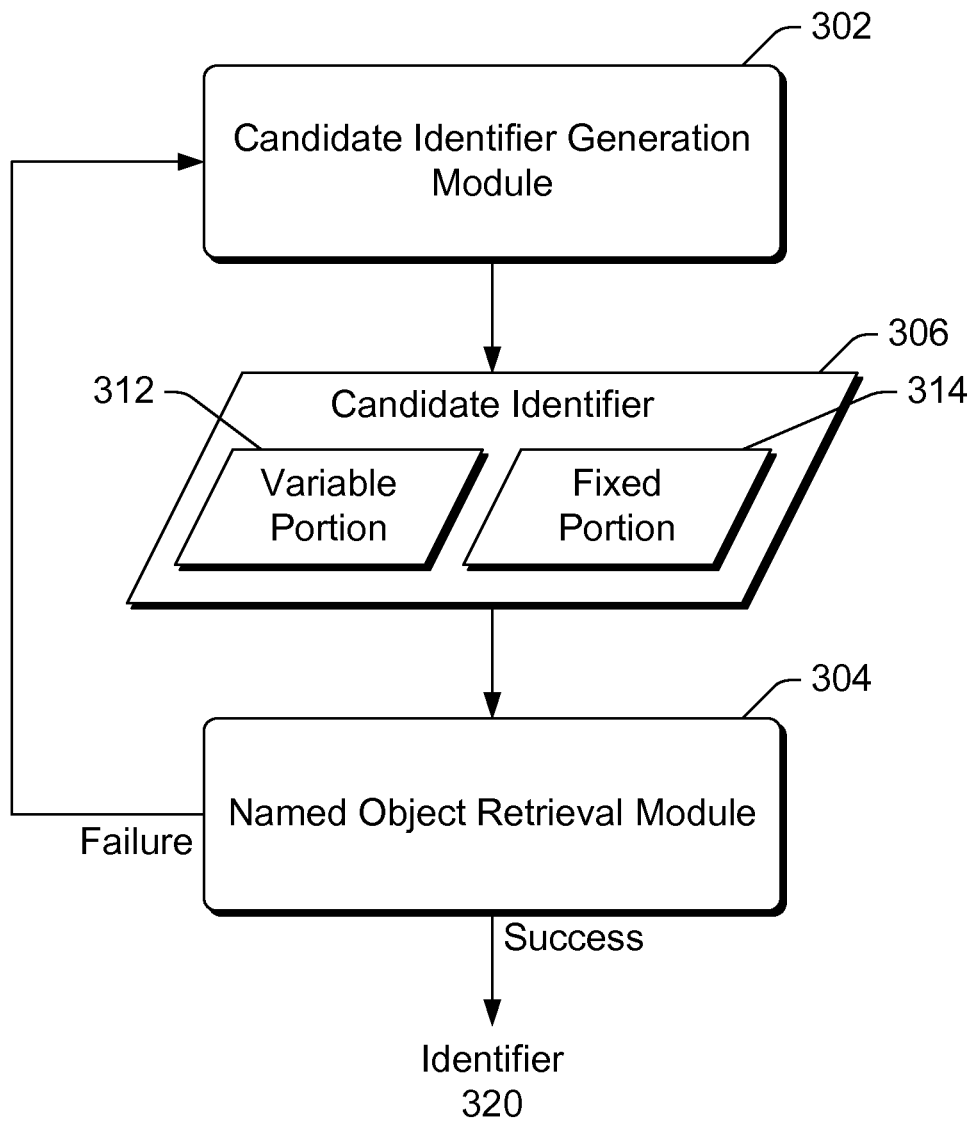
FIG. 3 illustrates an example named object based identifier generation system in accordance with one or more embodiments.

FIG. 3 illustrates an example named object based identifier generation system 300 in accordance with one or more embodiments. Named object based identifier generation system 300 can be implemented by, for example, named object based identifier generation module 108 of FIG. 1, named object based identifier generation module 118 of FIG. 1, named object based identifier generation module 218 of FIG. 2, combinations thereof, and so forth. System 300 attempts to generate an identifier each time an identifier for a process is requested or desired, although situations can arise where no such identifier can be generated as discussed in more detail below.

Named object based identifier generation system 300 includes a candidate identifier generation module 302 and a named object retrieval module 304. Candidate identifier generation module 302 generates a candidate identifier 306 based at least in part on a selected one of a set of values that includes a particular number of values. The particular number of values operates as a limit on the number of identifiers that can exist concurrently for one or more programs on a device. Whether this limit is a limit on the number of identifiers across all programs on the device or on a per-program basis depends on whether candidate identifier 306 includes a fixed portion, as discussed in more detail below.

This particular number of values can be preconfigured in system 300 and/or set by a user or administrator of a device including system 300. Typically, the particular number of values is larger than the total number of expected processes to be run concurrently on the device but not too large so as to reduce consumption of resources on the device. For example, if the total number of expected processes to be run concurrently on the device is 20-500, then the particular number of values can be 2000-3000. Alternatively, the particular number of values can be dynamic and used to throttle the number of processes on a device, as discussed in more detail below.

Candidate identifier generation module 302 selects one of the set of values as a basis for candidate identifier 306. The set of values can be a particular range of values, such as integer values ranging from 0 to limit-1 where limit refers to the limit on the number of identifiers that can exist concurrently for one or more programs on a device. The set of values can also be various other sets, such as a set of a particular number of even integer values, a set of a particular number of odd integer values, and so forth.

Candidate identifier generation module 302 selects a value from the set of values. In one or more embodiments, module 302 identifies a starting location in the set of values and selects the value at the starting location. This starting location can be identified in various manners. The starting location can be identified by generating a random or pseudo-random number that is within the particular number of values in the set of values. For example, if the particular number of values include 3,000 values, then a random or pseudo-random number between 1 and 3,000 can be generated, and the generated number is the starting location is the value in the set of values (e.g., if 2135 is generated randomly or pseudo-randomly, then the starting location is the $2135^{th}$ value in the set of values).

Alternatively, candidate identifier generation module 302 can identify a starting location in other manners. For example, the starting location can be a predetermined or fixed location in the set of values (e.g., the first location, the last location, the location half-way into the set of values, etc.), or can be determined using various other rules or criteria.

Candidate identifier generation module 302 uses the selected one of the set of values as a basis for candidate identifier 306. Candidate identifier 306 includes a variable portion 312 that is based on the selected value. Variable portion 312 can be the selected value, or alternatively another value generated based on the selected value (e.g., by applying a particular function or algorithm to the selected value). Candidate identifier 306 can also include a fixed portion 314, although alternatively candidate identifier 306 can include variable portion 312 but not include fixed portion 314.

Fixed portion 314 is typically an alphanumeric sequence, although other symbols or characters can alternatively or additionally be used. Fixed portion 314 is referred to as fixed because it is common across multiple candidate identifiers, whether it be common across candidate identifiers generated for processes of the same program and/or program version, or common across multiple programs and/or program versions. Fixed portion 314 typically identifies a program and/or program version corresponding to the process for which the identifier is being generated, although fixed portion 314 can alternatively be a value common across multiple programs and/or program versions. For example, fixed portion 314 can be the same value of "69869565c0fd" for processes regardless of the program or program version corresponding to the process. By way of another example, fixed portion 314 can be the value "ProgramWidgets1" for processes corresponding to version 1 of a program named "Widgets", the value "ProgramWidgets2" for processes corresponding to version 2 of a program named "Widgets", the value "ProgramAlpha" for processes corresponding to all versions of a program named "Alpha", and so forth.

In the illustrated example of FIG. 3, candidate identifier 306 includes two separate portions: variable portion 312 and fixed portion 314. Candidate identifier 306 typically includes these two portions concatenated together, optionally with a character or symbol separating the two. For example, if the fixed portion is "69869565c0fd" and the variable portion is "4378", then candidate identifier 306 can be "69869565c0fd_4378".

Alternatively, candidate identifier generation module 302 can combine variable portion 312 and fixed portion 314 in any of a variety of manners. For example, the two portions can be mathematically added to one another, one of the two portions can be mathematically subtracted from the other, the two values can be exclusive-OR'd with one another, and so forth. The two portions can alternatively be combined using any of a variety of other rules, criteria, functions, algorithms, and so forth.

After candidate identifier 306 is generated, named object retrieval module 304 attempts to have a named object created having a name that is candidate identifier 306. Named object retrieval module 304 submits a request to an operating system module that creates named objects (e.g., named object management module 112 of FIG. 1 or named object management module 212 of FIG. 2) to have a named object created having a name that is candidate identifier 306. As discussed above, named object management module 112 prevents a named object from being created on a device if another object on the device already has that same name. Accordingly, if a named object having candidate identifier 306 does not already exist on the device, then the attempt to create the named object having a name that is the candidate identifier 306 is successful. However, if a named object having candidate identifier 306 does already exist on the device, then the attempt to create the named object having a name that is the candidate identifier 306 is not successful (the attempt fails).

If the attempt to create the named object having a name that is the candidate identifier 306 is successful, then candidate identifier 306 is provided as identifier 320. Identifier 320 is the named object based identifier generated by system 300. Identifier 320 is thus the identifier for a process, such as a security identifier as discussed above. It should be noted that once the named object is created with a name that is identifier 320, subsequent attempts to create the named object having that same name will fail because the named object having that name already exists. Thus, it is assured that no other process running on the device will concurrently have the same identifier.

However, if the attempt to create the named object having a name that is the candidate identifier 306 is not successful, then candidate identifier 306 returns an indication of the failure to candidate identifier generation module 302. In response to the failure indication, candidate identifier generation module 302 generates an additional candidate identifier 306. Module 302 generates this additional candidate identifier 306 in the same manner as discussed above, although variable portion 312 of the additional candidate identifier 306 is based on a different selected one of the set of values.

Module 302 can select a different one of the set of values for the additional candidate identifier 306 in various different manners. In one or more embodiments, module 302 selects a different one of the set of values by selecting the next value sequentially in the set of values from the most recently selected value. For example, if the set of values is integers ranging from 0 to 450, and the variable portion 312 for the previously generated candidate identifier 306 was 37, then the next value sequentially would be 38, and the value 38 is selected as the variable portion 312. If the most recently selected value was the last value in the set of values, then the selection process wraps around and the first value in the set of values is selected by module 302. For example, if the set of values is integers ranging from 0 to 450, and the variable portion 312 for the previously generated candidate identifier 306 was 450, then the next value sequentially would be 0, and the value 0 is selected as the variable portion 312. Alternatively, different ones of the set of values can be selected in other manners, such as selecting the previous value sequentially in the set of values from the most recently selected value (wrapping around from the first value to the last value in the set of values as appropriate), selecting a value at a random or pseudo-randomly selected location, selecting a value or location using various other rules or criteria, and so forth.

Once the additional candidate identifier 306 is generated, named object retrieval module 304 attempts to have a named object created having a name that is the additional candidate identifier 306. This attempt can be successful or unsuccessful, as discussed above.

This generation of candidate identifiers and attempts to have a named object created having the candidate identifier can be repeated one or more times. How many times this generating and attempting is repeated can vary based on different criteria. In one or more embodiments, the generating and attempting is repeated until a named object having a generated candidate identifier is created, or the number of attempts to have the named object created is equal to the particular number of values in the set of values that is used as a basis for candidate identifier 306. In other embodiments, this generating and attempting is repeated a particular number of times (e.g., three times, ten times, etc.). This particular number of times that the generating and attempting is repeated can be pre-configured in system 300, can be identified by a user or administrator of a device including system 300, and so forth.

If the generating and attempting is not able to successfully have the named object created (after trying the particular number of times, after the number of attempts to have the named object created is equal to the particular number of values in the set of values that is used as a basis for candidate identifier 306, etc.), then an indication is returned by system 300 that the identifier could not be created. Thus, the program or module desiring to have the identifier for a process generated is informed that the identifier cannot be generated at the current time. The program or module can then take an appropriate action, such as not creating a particular process for which the identifier was desired.

As discussed above, the particular number of values from which candidate identifier generation module 302 can select as a basis for variable portion 312 operates as a limit on the number of identifiers that can exist concurrently for one or more programs on a device. The particular number of values from which candidate identifier generation module 302 can select as a basis for variable portion 312 can also operate as a limit on the number of processes that can exist (e.g., be running concurrently) on a device. For example, if an identifier generated by system 300 is used as the security identifier for a process and a program does not create a process if the program is unable to generate a unique security identifier for the process, then the particular number of values from which module 302 can select is also a limit on the number of processes that can exist on a device because a process will not be created without a security identifier.

If the candidate identifiers are generated to include fixed portion 314 as discussed above, then the number of processes that can exist on a device is limited to, for each fixed portion, the particular number of values in the set of values from which candidate identifier generation module 302 can select for variable portion 312. For example, if each fixed portion is different for each version of each program, and if the particular number of values in the set of values from which module 302 can select for variable portion 312 is 98 values, then system 300 limits the number of security identifiers to be 98 for each version of each program, and the number of processes that can exist at any one time on the device is thus also limited to 98 for each version of each program. By way of another example, if each fixed portion is different for each program (regardless of version of the program), and if the particular number of values in the set of values from which module 302 can select for variable portion 312 is 128 values, then system 300 limits the number of security identifiers to be 128 for each program, and the number of processes that can exist at any one time on the device is thus also limited to 128 for each program (regardless of the program version).

However, if the candidate identifiers are generated to include variable portion 312 but not fixed portion 314 as discussed above, then the number of processes that can exist on a device is limited to the particular number of values in the set of values from which candidate identifier generation module 302 can select for variable portion 312 regardless of which programs and/or program versions are on the device. For example, if the particular number of values in the set of values from which module 302 can select for variable portion 312 is 532 values, then system 300 limits the number of security identifiers to be 532, and the number of processes that can exist at any one time on the device is thus also limited to 532.

In one or more embodiments, the particular number of values in the set of values from which candidate identifier generation module 302 can select serves as a limit on the number of processes that can be running on a device. The particular number of values can be dynamic, being adjusted (e.g., by an operating system on the device implementing system 300, such as operating system 102 of FIG. 1 or operating system 202 of FIG. 2) and used to throttle the number of processes on a device based on a performance of the device. Various monitors or performance counters can be included on the device to keep track of device performance. These counters can monitor various resource usage, such as processor usage, memory usage, storage device usage, network connection usage, and so forth in a variety of different publicly known and/or proprietary manners.

If particular rules or criteria are met (e.g., particular thresholds for resource usage over a particular time duration are satisfied), then the particular number of values in the set of values from which candidate identifier generation module 302 can select can be reduced. The amount of the reduction can vary, such as by a fixed amount (e.g., by 100 values) and/or by a variable amount (e.g., by 10% of the current particular number of values in the set of values from which module 302 can select, by an amount so that the particular number of values in the set of values from which module 302 can select equals the current number of processes running on the device). Similarly, if other particular rules or criteria are met (e.g., other particular thresholds for resource usage over a particular time duration are satisfied), then the particular number of values in the set of values from which candidate identifier generation module 302 can select can be increased. The amount of the increase can vary, such as by a fixed amount (e.g., by 100 values) and/or by a variable amount (e.g., by 10% of the current particular number of values in the set of values from which module 302 can select, to a previously configured (e.g., by an administrator or user) value).

It should be noted that, when a process is terminated, named objects created for that process are typically released (e.g., by the process or other process of the corresponding program). The program can be the owner of the named objects and release the named objects created for a process when the process is terminated, or each process itself can be the owner of the named objects created for that process so that when a process is terminated the named objects created for (and owned by) that process are automatically released. An operating system module (e.g., named object management module 112 of FIG. 1 or named object management module 212 of FIG. 2) that manages the named objects is typically notified of the release of the named objects. In response, the operating system deletes or removes those released named objects. Thus, for a process that is terminated, the named object having a name generated from a candidate identifier for the process by system 300 is released. A named object having that particular name no longer exists on the device, and a subsequent attempt to create a named object having that particular name would be successful.

Alternatively, a program can re-use identifiers for processes. In such situations, when a process is terminated, the program maintains a record of the identifier of the terminated process as not currently being in use but does not release the named object having that identifier as a name. When a new process is subsequently created for the program, the program can re-use the identifier for the new process without having a new identifier created by a named object based identifier generation module. Identifiers can be re-used any number of times, and optionally can be used no more than a threshold number of times (which can be configured pre-configured in the program, set by an administrator or user of a device running the program, and so forth). A program can optionally have one or more identifiers pre-created by a named object based identifier generation module and then use those pre-created identifiers as new processes are created. The number of identifiers that are pre-created can be determined in different manners (e.g., can be pre-configured in the program, can be set by an administrator or user of a device running the program, can be based on a system load (e.g., a number of named objects already created on the device running the program, the device performance based on various monitors or performance counters), and so forth). A program can also have an identifier created in response to desiring to create a new process and having no identifiers available for re-use.

Typically, the candidate identifier is generated in the same manner for each process. For example, if variable portion 312 is generated by applying a particular function to the selected value, then each selected value has that same particular function applied to it to generate variable portion 312. Alternatively, candidate identifiers can be generated in different manners for different processes (e.g., starting locations in a set of values for selection of a value for a variable portion in generating candidate identifiers can vary for different processes, different functions can be applied to selected values to generate variable portion 312 for different processes, and so forth).

It should be noted that different programs can have different values for fixed portions, although different instances of the same program typically have the same value for fixed portions. Nonetheless, because the candidate identifier includes the variable portion and the candidate identifier is used as the identifier only if the named object is created, different identifiers are generated for different processes of different instances of the same program despite the common fixed portions.

Although discussed herein with reference to using named objects to prevent multiple processes on the device from concurrently having the same identifier, such prevention can be performed in other manners. For example, rather than attempting to create a named object with the candidate identifier, a record of used identifiers can be checked. This record can be, for example, a database, table, file, and so forth. System 300 can access the record directly, or alternatively via a service or module that maintains the record. If the candidate identifier is already included in the record (and thus is already used for a process), then an additional candidate identifier is generated and the record is checked again. However, if the candidate identifier is not already included in the record (and thus is not already used for a process), then the candidate identifier is added to the record and used as the identifier for the process. When the process is terminated, the process (or other module or process) updates the record to remove the identifier from the record.

Figure 4:
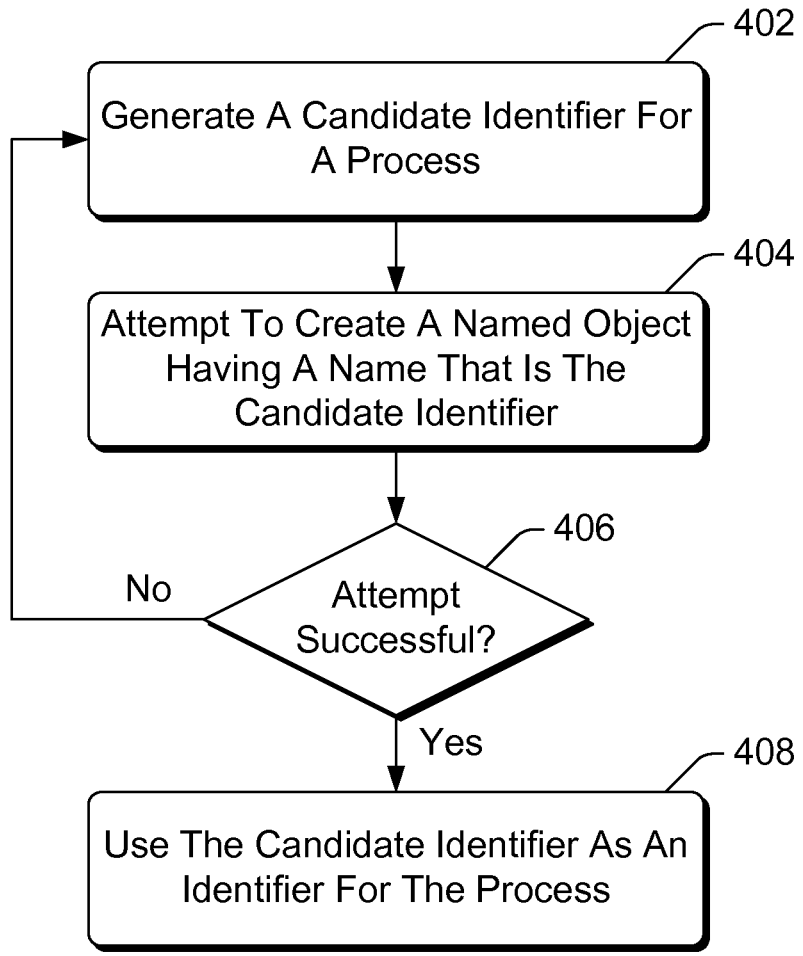
FIG. 4 is a flowchart illustrating an example process for a device implementing identifier generation using named objects with one or more embodiments.

FIG. 4 is a flowchart illustrating an example process 400 for a device implementing identifier generation using named objects with one or more embodiments. Process 400 is carried out by a system, such as system 300 of FIG. 3, and can be implemented in software, firmware, hardware, or combinations thereof. Process 400 is performed each time an identifier for a process is requested or desired. Process 400 is shown as a set of acts and is not limited to the order shown for performing the operations of the various acts. Process 400 is an example process for implementing identifier generation using named objects; additional discussions of implementing identifier generation using named objects are included herein with reference to different figures.

In process 400, a candidate identifier for a process is generated (act 402). This candidate identifier includes a variable portion and can also include a fixed portion as discussed above.

An attempt is made to have a named object having a name that is the candidate identifier created (act 404). The attempt may be successful or unsuccessful based on whether a named object having that name already exists as discussed above.

Process 400 proceeds based on whether the attempt is successful (act 406). If the attempt is successful, then the candidate identifier is used as the identifier for the process (act 408). This identifier can be, for example, a security identifier as discussed above.

However, if the attempt is not successful, then process 400 returns to act 402 to generate another candidate identifier and attempt to have a named object having a name that is the additional candidate identifier created. This generating and attempting can be repeated one or more times as discussed above.

Figure 5:
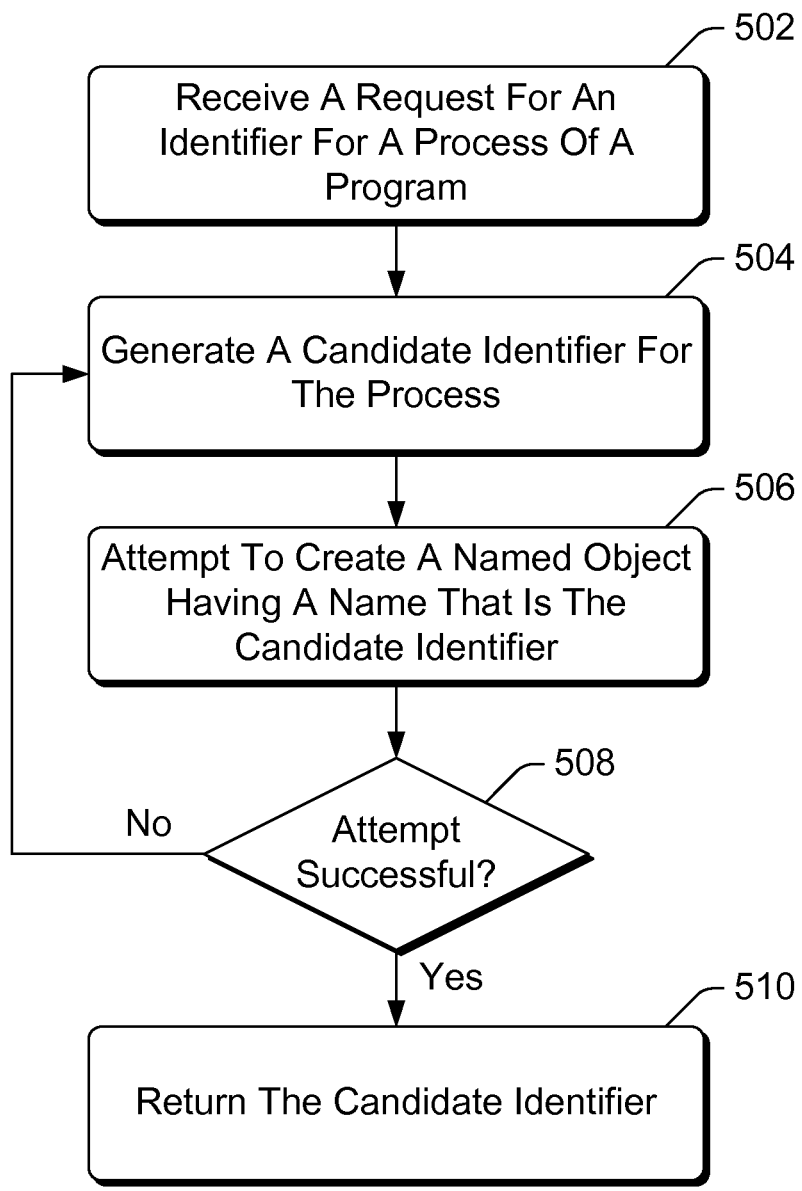
FIG. 5 is a flowchart illustrating another example process for a device implementing identifier generation using named objects with one or more embodiments.

FIG. 5 is a flowchart illustrating another example process 500 for a device implementing identifier generation using named objects with one or more embodiments. Process 500 is carried out by a system, such as system 300 of FIG. 3, and can be implemented in software, firmware, hardware, or combinations thereof. Process 500 is performed each time an identifier for a process is requested. Process 500 is shown as a set of acts and is not limited to the order shown for performing the operations of the various acts. Process 500 is an example process for implementing identifier generation using named objects; additional discussions of implementing identifier generation using named objects are included herein with reference to different figures.

In process 500, a request for an identifier for a process of a program is received (act 502). The request can be received from the program (e.g., a parent or other process of the program). The identifier can be a security identifier for the process, as discussed above.

A candidate identifier for the process is generated (act 504). This candidate identifier includes a variable portion and can also include a fixed portion as discussed above.

An attempt is made to have a named object having a name that is the candidate identifier created (act 506). The attempt may be successful or unsuccessful based on whether a named object having that name already exists as discussed above.

Process 500 proceeds based on whether the attempt is successful (act 508). If the attempt is successful, then the candidate identifier is returned (act 510). The candidate identifier is returned as the identifier for the process, and can be returned to the requester (e.g., the program from which the request was received in act 502). However, if the attempt is not successful, then process 500 returns to act 504 to generate an additional candidate identifier and attempt to have a named object having a name that is the additional candidate identifier created. This generating and attempting can be repeated one or more times as discussed above.

Various actions such as receiving, requesting, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
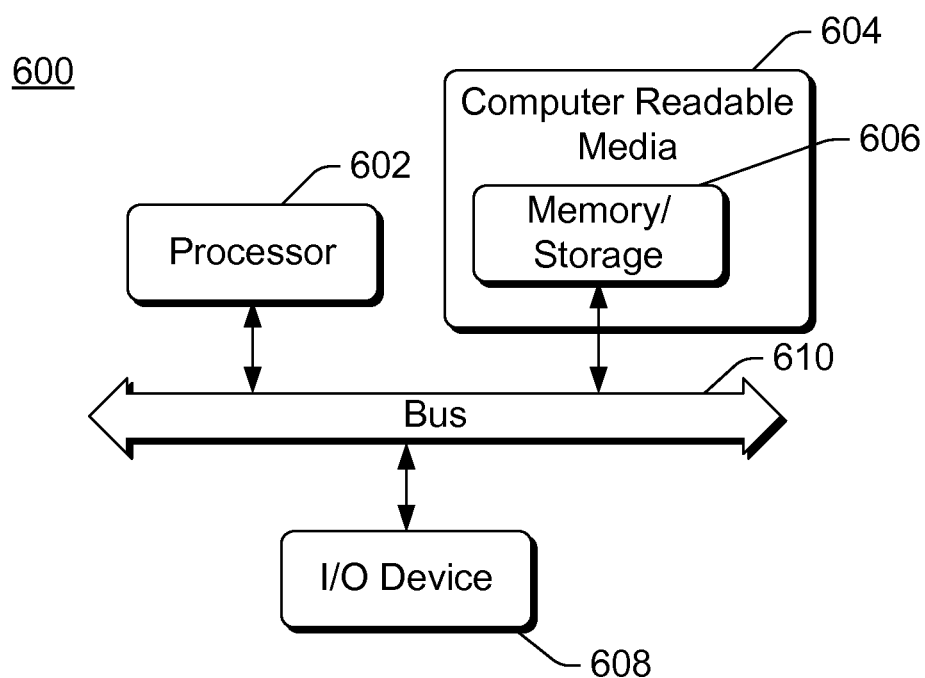
FIG. 6 illustrates an example computing device that can be configured to implement the identifier generation using named objects in accordance with one or more embodiments.

FIG. 6 illustrates an example computing device 600 that can be configured to implement the identifier generation using named objects in accordance with one or more embodiments. Computing device 600 can be, for example, device 100 of FIG. 1 or device 200 of FIG. 2.

Computing device 600 includes one or more processors 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Processor 602, computer readable media 604, one or more of devices 608, and/or bus 610 can optionally be implemented as a single component or chip (e.g., a system on a chip). Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processors 602. It is to be appreciated that different instructions can be stored in different components of computing device 600, such as in a processor 602, in various cache memories of a processor 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the identifier generation using named objects techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating, at a device, a candidate identifier for a process, the candidate identifier comprising a first portion and a second portion, the first portion being common across multiple candidate identifiers and the second portion being selected from a set of values, the set of values being a function of rules or criteria that determine the process's access to resources of the device, a particular number of values in the set of values being based on performance counters of the device;
   attempting to have a named object created, the named object having a name that is the candidate identifier;

using, in response to the attempting successfully having the named object created, the candidate identifier as an identifier for the process;

preventing, in response to the attempting to have a named object created, the creating of the named object having the same name as another named object; and repeating, in response to the attempting not successfully having the named object created, the generating and attempting by selecting another value from the set of values for the second portion.

2. A method as recited in claim 1, the identifier for the process comprising a security identifier indicating which of one or more resources of the device the process is permitted to access.

3. A method as recited in claim 1, the candidate identifier including the first portion being a fixed portion and the second portion being a variable portion.

4. A method as recited in claim 1, the particular number of values being a limit on a number of processes that can exist on the device.

5. A method as recited in claim 4, the process being a process of a program, and the limit being a limit on a number of processes of the program that can exist on the device.

6. A method as recited in claim 1, further comprising releasing the named object when the process terminates.

7. A method as recited in claim 1, the repeating comprising repeating the generating and attempting a particular number of times, and ceasing the generating and attempting after the particular number of times.

8. A method as recited in claim 1, the process being a process of a program, and the generating, attempting, and using being performed by the program.

9. A method as recited in claim 1, the attempting successfully having the named object created only if another named object having a name that is the candidate identifier does not exist on the device.

10. A method as recited in claim 1, wherein the performance counters represent resource usage.

11. A method as recited in claim 10, wherein the performance counters comprise processor usage, memory usage, storage usage, or network connection usage.

12. A system comprising:
one or more processors;
one or more computer storage media having stored thereon multiple instructions that, when executed by the one or more processors of a computing device, cause the one or more processors to:
receive a request for an identifier for a process of a program;
generate, at the computing device, a candidate identifier for the process, the candidate identifier comprising a first portion and a second portion, the first portion being common across multiple candidate identifiers and the second portion being selected from a set of values, the set of values being a function of rules or criteria that determine the process's access to resources of the device, a particular number of values in the set of values being based on performance counters of the device;
attempt to create a named object having a name that is the candidate identifier; prevent, in response to the attempting to have created a named object having the same name as another named object, the creating of the named object; and
return to the program, in response to the attempt successfully creating the named object, the candidate identifier as the identifier for the process.

13. A system as recited in claim 12, the multiple instructions further causing the one or more processors to, in response to the attempt not successfully creating the named object:
generate an additional candidate identifier for the process, the additional candidate identifier comprising the first portion and an additional second portion, the first portion being common across multiple candidate identifiers and the additional second portion being selected from the set of values;
attempt to create an additional named object having a name that is the additional candidate identifier; and
return to the program, in response to the attempt successfully creating the additional named object, the additional candidate identifier as the identifier for the process.

14. A system as recited in claim 13, the multiple instructions further causing the one or more processors to repeatedly generate further additional candidate identifiers and attempt to create the additional named object with the further additional candidate identifiers until the attempt is successful.

15. A system as recited in claim 12, the identifier for the process comprising a security identifier indicating which of one or more resources of the computing device the process is permitted to access.

16. A system as recited in claim 12, the candidate identifier including the first portion being a fixed portion and the second portion being a variable portion.

17. A system as recited in claim 12, the particular number of values being a limit on a number of processes that can be running concurrently on in the computing device.

18. A system as recited in claim 17, the limit being a limit on a number of processes of the program that can be running concurrently on the computing device.

19. A system as recited in claim 12, the multiple instructions further causing the one or more processors to release the named object when the process terminates.

20. A method comprising:
receiving a request for a security identifier for a process of a program on a computing device, the security identifier indicating which of one or more resources of the computing device the process is permitted to access;
generating, at the computing device, a candidate security identifier for the process, the candidate security identifier including a fixed portion and a variable portion, the fixed portion being common across multiple candidate identifiers and identifying the program, and the variable portion being selected from a particular set of values, the set of values being a function of rules or criteria that determine the process's access to resources of the device, a particular number of values in the set of values being based on performance counters of the device;
attempting to create a named object having a name that is the candidate security identifier;
in response to the attempting successfully creating the named object, returning the candidate security identifier as the security identifier for the process;
in response to the attempting to have a named object created having the same name as another named object, preventing the creating of the named object; and
in response to the attempting not successfully creating the named object, repeating the generating and attempting by selecting another value from the set of values for the second portion one or more times.

* * * * *